US009658065B2

(12) United States Patent
Tsutsumi

(10) Patent No.: US 9,658,065 B2
(45) Date of Patent: May 23, 2017

(54) PHYSICAL QUANTITY DETECTION CIRCUIT, PHYSICAL QUANTITY DETECTION DEVICE, ELECTRONIC APPARATUS AND MOVING OBJECT

(71) Applicant: Seiko Epson Corporation, Tokyo (JP)

(72) Inventor: Akio Tsutsumi, Chino (JP)

(73) Assignee: Seiko Epson Corporation (JP)

(*) Notice: Subject to any disclaimer, the term of this patent is extended or adjusted under 35 U.S.C. 154(b) by 282 days.

(21) Appl. No.: 14/259,590

(22) Filed: Apr. 23, 2014

(65) Prior Publication Data

US 2014/0318244 A1 Oct. 30, 2014

(30) Foreign Application Priority Data

Apr. 24, 2013 (JP) ................... 2013-090862

(51) Int. Cl.
| | | |
|---|---|---|
| G01C 19/00 | (2013.01) | |
| G01P 3/44 | (2006.01) | |
| G01P 9/00 | (2012.01) | |
| G01P 15/08 | (2006.01) | |
| G01C 19/5776 | (2012.01) | |
| G01C 19/5614 | (2012.01) | |

(52) U.S. Cl.
CPC ..... *G01C 19/5776* (2013.01); *G01C 19/5614* (2013.01)

(58) Field of Classification Search
CPC . G01C 19/56; G01C 19/5776; G01C 19/5614
USPC ....... 73/504.12; 128/901; 327/310; 700/280; 702/69, 191
See application file for complete search history.

(56) References Cited

U.S. PATENT DOCUMENTS

| | | | |
|---|---|---|---|
| 2009/0217757 A1 | 9/2009 | Nozawa | |
| 2010/0169028 A1* | 7/2010 | Shiraki et al. ......... | G01N 29/32 702/56 |
| 2011/0080153 A1* | 4/2011 | Metzger et al. .......... | G05F 3/20 323/311 |

FOREIGN PATENT DOCUMENTS

| | | |
|---|---|---|
| JP | 04-346024 A | 12/1992 |
| JP | 2007-327943 A | 12/2007 |
| JP | 2008-224230 A | 9/2008 |
| JP | 2009-229447 A | 10/2009 |
| JP | 2010-147663 A | 7/2010 |
| JP | 2012-159429 A | 8/2012 |

\* cited by examiner

*Primary Examiner* — Lisa Caputo
*Assistant Examiner* — Roger Hernandez-Prewit
(74) *Attorney, Agent, or Firm* — Harness, Dickey & Pierce, P.L.C.

(57) ABSTRACT

A detection circuit (physical quantity detection circuit) includes a digital arithmetic operation circuit (arithmetic operation processing portion) that performs an arithmetic operation process of generating an arithmetic operation signal according to a magnitude of a physical quantity, on the basis of a detection signal corresponding to the physical quantity. The digital arithmetic operation circuit performs an arithmetic operation process including a power supply voltage fluctuation correction process of correcting at least one of the detection signal and a signal which is obtained by a portion of the arithmetic operation process with respect to the detection signal, on the basis of a correction expression using a power supply voltage to be supplied as a variable.

18 Claims, 12 Drawing Sheets

PHYSICAL QUANTITY DETECTION CIRCUIT, PHYSICAL QUANTITY DETECTION DEVICE, ELECTRONIC APPARATUS AND MOVING OBJECT

BACKGROUND

1. Technical Field

The present invention relates to a physical quantity detection circuit, a physical quantity detection device, an electronic apparatus and a moving object.

2. Related Art

Nowadays, physical quantity detection devices, such as an acceleration sensor that detects an acceleration and a gyro sensor that detects an angular velocity, which are capable of detecting various physical quantities are being widely used in various systems and electronic apparatuses. In recent years, physical quantity detection devices have been mounted on automobiles and the like, and have required high detection accuracy and high reliability even under noisy environments.

For example, JP-A-2009-229447 proposes a physical quantity measuring device which is capable of constantly maintaining detection sensitivity for a physical quantity attempted to be detected even when the amplitude of drive vibration fluctuates. In addition, JP-A-2007-327943 proposes a detection device which is capable of efficiently removing an undesired signal due to the vibration leakage of a vibrator.

Among physical quantity detection devices of the related art, there are devices having a wide range of a power supply voltage supplied from the outside so as to be capable of being generally used in various applications. In such a physical quantity detection device, a delay or a phase shift in an internal circuit is caused by a fluctuation in power supply voltage, depending on the configuration thereof, and as a result, an output value gives rise to a fluctuation dependent on a power supply voltage, which leads to the possibility of a deterioration in characteristics being caused.

SUMMARY

An advantage of some aspects of the invention is to provide a physical quantity detection circuit capable of reducing a fluctuation in output due to a fluctuation in power supply voltage, and a physical quantity detection device, an electronic apparatus and a moving object using such a physical quantity detection circuit.

An aspect of the invention can be implemented as the following forms or application examples.

Application Example 1

This application example is directed to a physical quantity detection circuit including an arithmetic operation processing portion that performs an arithmetic operation process of generating an arithmetic operation signal according to a magnitude of a physical quantity, on the basis of a detection signal corresponding to the physical quantity, wherein the arithmetic operation process includes a power supply voltage fluctuation correction process of correcting at least one of the detection signal and a signal which is obtained by a portion of the arithmetic operation process with respect to the detection signal, on the basis of a correction expression using a power supply voltage to be supplied as a variable.

According to the physical quantity detection circuit of this application example, the signal is corrected on the basis of the correction expression using the power supply voltage as a variable, and thus it is possible to reduce a fluctuation in output due to a fluctuation in power supply voltage.

Application Example 2

In the physical quantity detection circuit according to the application example described above, the power supply voltage fluctuation correction process may include a process of correcting an offset of at least one of the detection signal and the signal which is obtained by a portion of the arithmetic operation process with respect to the detection signal.

According to the physical quantity detection circuit of this application example, it is possible to correct a fluctuation in offset of an output signal due to a fluctuation in power supply voltage.

Application Example 3

In the physical quantity detection circuit according to the application example described above, the correction expression may be an expression of a quadratic function of the power supply voltage.

Application Example 4

In the physical quantity detection circuit according to the application example described above, the arithmetic operation process may include a power supply voltage fluctuation correction amount calculation process of calculating a correction amount of the power supply voltage using the correction expression, and the power supply voltage fluctuation correction process may include a process of adding the correction amount to at least one of the detection signal and the signal which is obtained by a portion of the arithmetic operation process with respect to the detection signal.

Application Example 5

In the physical quantity detection circuit according to the application example described above, the arithmetic operation processing portion may perform the power supply voltage fluctuation correction process and the power supply voltage fluctuation correction amount calculation process by digital processing, using detection data obtained by digitizing the detection signal and power supply voltage data obtained by digitizing the power supply voltage.

According to the physical quantity detection circuit of this application example, the correction of a fluctuation in output due to a fluctuation in power supply voltage is performed by digital processing, and thus it is possible to increase correction accuracy.

Application Example 6

In the physical quantity detection circuit according to the application example described above, in the arithmetic operation process, a period for which the power supply voltage fluctuation correction amount calculation process is performed may be longer than a period for which the power supply voltage fluctuation correction process is performed.

According to the physical quantity detection circuit of this application example, the calculation of the correction amount of a fluctuation in output due to a fluctuation in power supply voltage is performed intermittently, and thus it is possible to reduce the amount of calculation and power consumption.

Application Example 7

This application example is directed to a physical quantity detection device including: a sensor element that outputs a detection signal corresponding to a physical quantity; and any of the physical quantity detection circuits described above.

The physical quantity detection device according to this application example may be, for example, an inertial sensor such as an acceleration sensor, a gyro sensor (angular velocity sensor), or a velocity sensor, and may be a clinometer that measures the angle of inclination on the basis of gravity.

Application Example 8

This application example is directed to an electronic apparatus including any of the physical quantity detection circuits described above.

Application Example 9

This application example is directed to a moving object including any of the physical quantity detection circuits described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings. Meanwhile, the embodiments described below are not unduly limited to the disclosure of the invention described in the appended claims. In addition, all the configurations described below are not necessarily essential components of the invention.

1. Physical Quantity Detection Device

Figure 1:
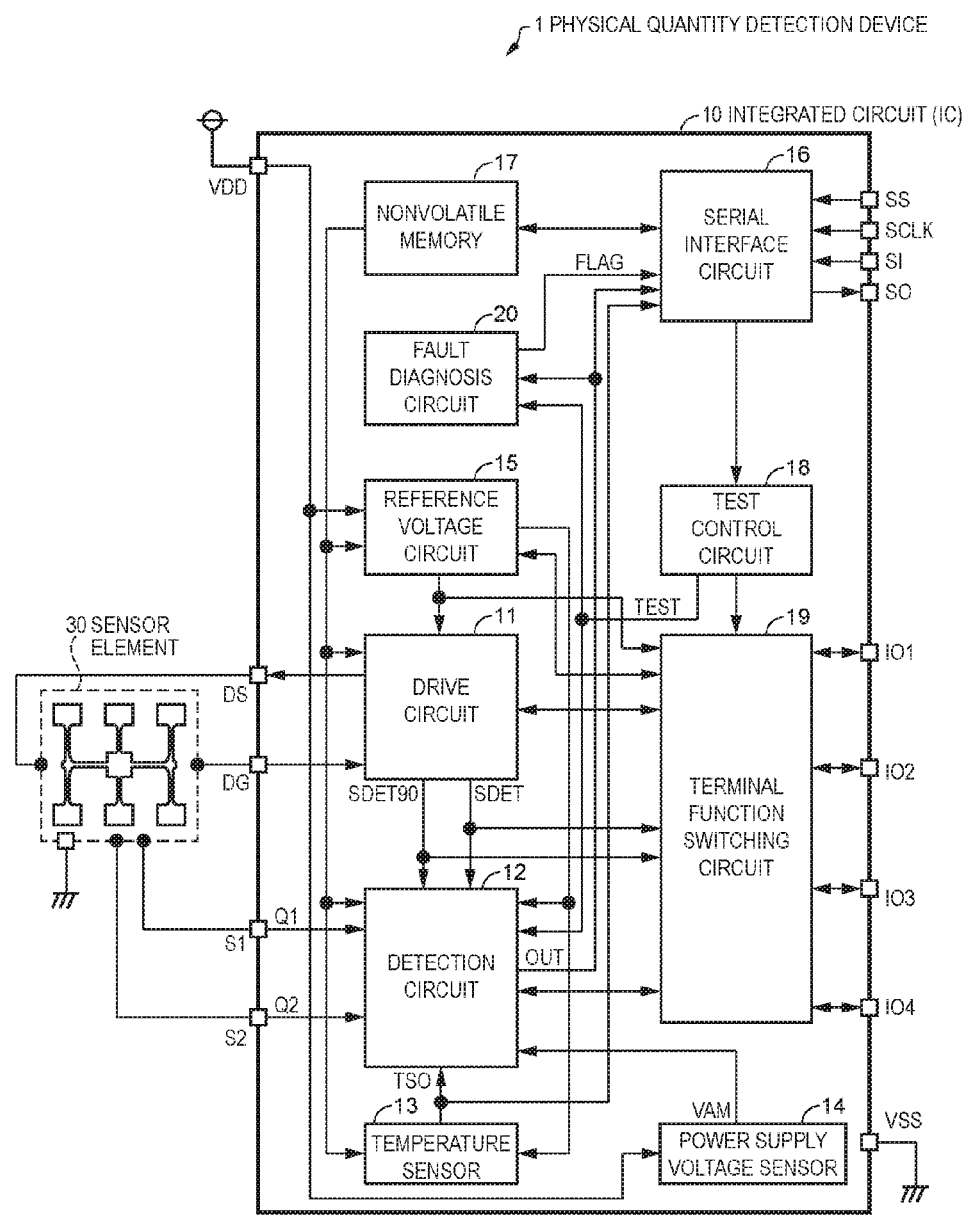
FIG. 1 is a diagram illustrating a configuration example of a physical quantity detection device according to the present embodiment.

FIG. 1 is a diagram illustrating a configuration example of a physical quantity detection device according to the present embodiment. As shown in FIG. 1, a physical quantity detection device 1 according to the present embodiment includes an integrated circuit (IC) 10 and a sensor element 30.

The sensor element 30 has a vibrator element in which a drive electrode and a detection electrode are disposed, and the vibrator element is generally sealed by a package secured with air-tightness in order to increase an oscillation efficiency by minimizing the impedance of the vibrator element. In the present embodiment, the sensor element 30 is provided with a so-called double T-type vibrator element having two T-type drive vibration arms.

Figure 2:
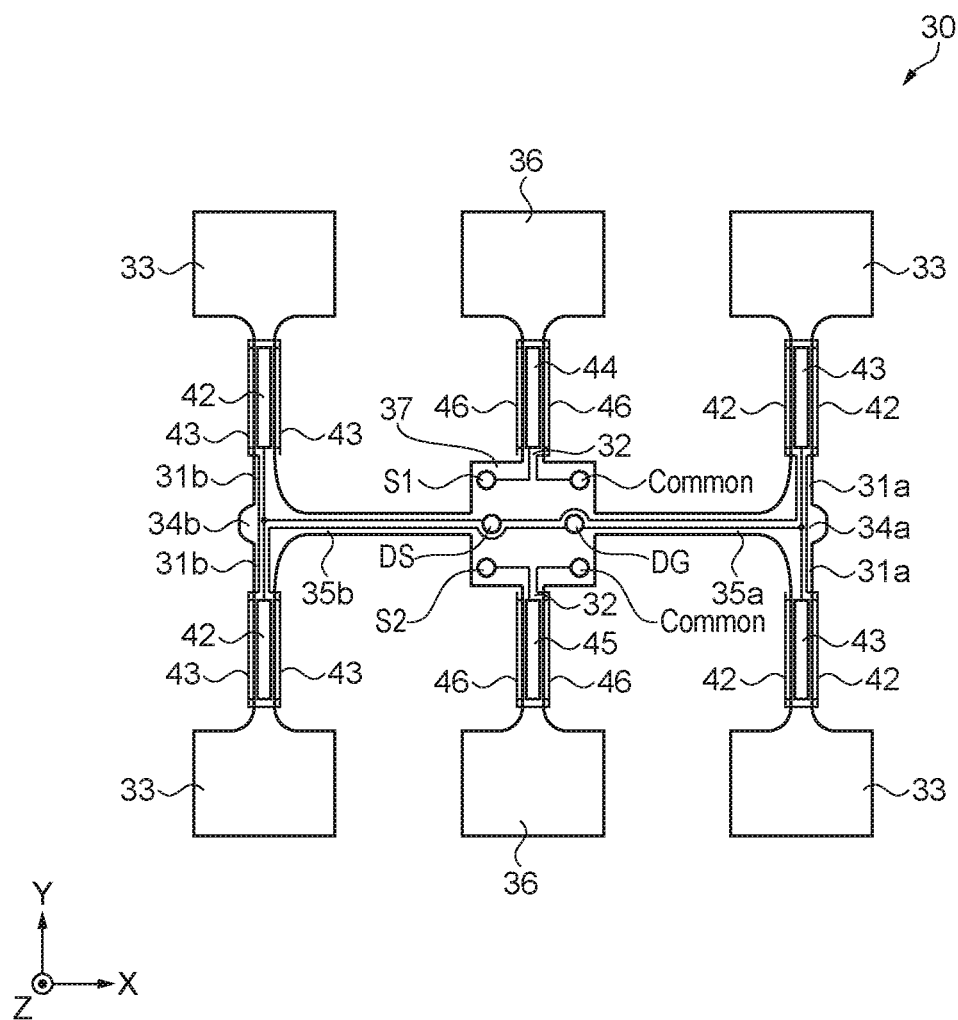
FIG. 2 is a plan view illustrating a vibrator element of a sensor element.

FIG. 2 is a plan view illustrating a vibrator element of the sensor element 30 according to the present embodiment. The sensor element 30 has a double T-type vibrator element formed by, for example, a Z cut quartz crystal substrate. Since the vibrator element made using quartz crystal as a material has an extremely small fluctuation in resonance frequency with a change in temperature, there is the advantage of being able to increase the detection accuracy of angular velocity. Meanwhile, an X-axis, a Y-axis, and a Z-axis in FIG. 2 indicate axes of quartz crystal.

As shown in FIG. 2, the vibrator element of the sensor element 30 is configured such that drive vibration arms 31a and 31b extend in a +Y-axis direction and a −Y-axis direction from two drive basal portions 34a and 34b, respectively. Drive electrodes 42 and 43 are respectively formed on the lateral side and the upper surface of the drive vibration arm 31a, and drive electrodes 43 and 42 are respectively formed on the lateral side and the upper surface of the drive vibration arm 31b. The drive electrodes 42 and 43 are respectively connected to a drive circuit 11 through a DS terminal and a DG terminal of the integrated circuit (IC) 10 shown in FIG. 1.

The drive basal portions 34a and 34b are respectively connected to a rectangular detection basal portion 37 through connecting arms 35a and 35b extending in an −X-axis direction and an +X-axis direction.

A detection vibration arm 32 extends in the +Y-axis direction and the −Y-axis direction from the detection basal portion 37. Detection electrodes 44 and 45 are formed on the upper surface of the detection vibration arm 32, and a common electrode 46 is formed on the lateral side of the detection vibration arm 32. The detection electrodes 44 and 45 are respectively connected to a detection circuit 12 through an S1 terminal and an S2 terminal of the integrated circuit (IC) 10 shown in FIG. 1. In addition, the common electrode 46 is grounded.

Figure 3:
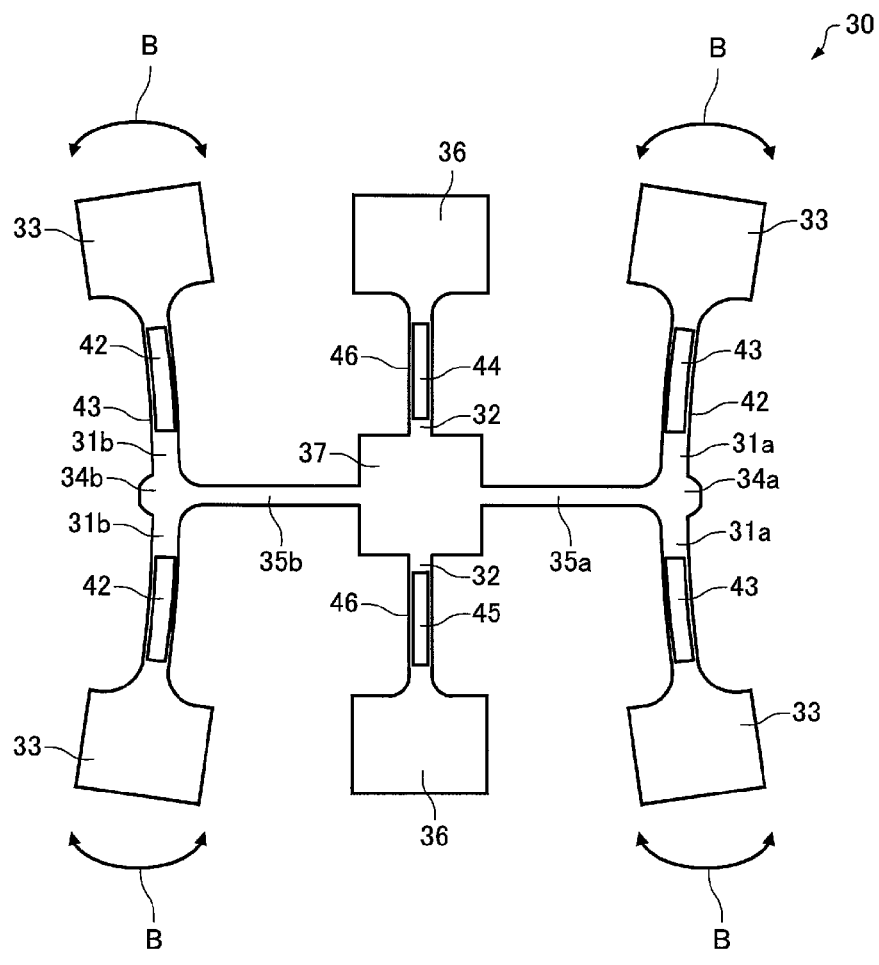
FIG. 3 is a diagram illustrating operations of the sensor element.

When an AC voltage is given as a drive signal between the drive electrode 42 and the drive electrode 43 of the drive vibration arms 31a and 31b, as shown in FIG. 3, the drive vibration arms 31a and 31b perform flexural vibrations (excitation vibrations) in which the leading ends of the two drive vibration arms 31a and 31b are repeatedly approached and separated to and from each other as indicated by arrow B due to an inverse piezoelectric effect.

Figure 4:
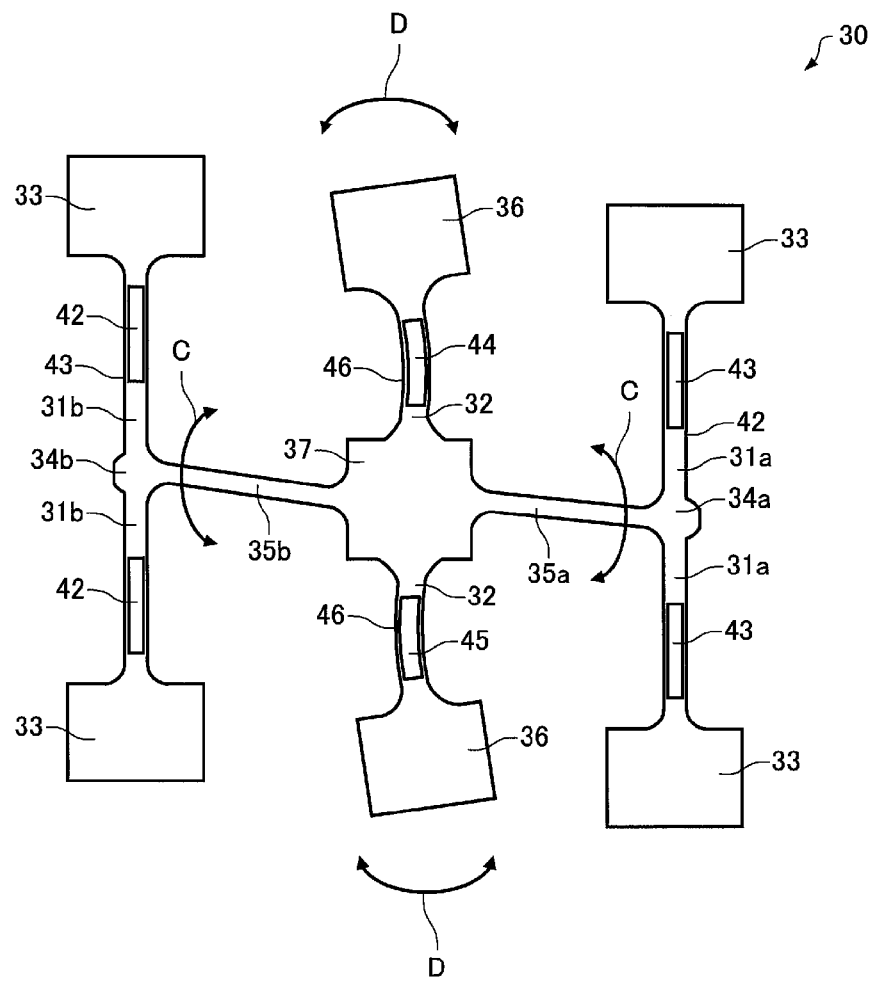
FIG. 4 is a diagram illustrating operations of the sensor element.

In this state, when an angular velocity using the Z-axis as its rotation axis is applied to the vibrator element of the sensor element 30, the drive vibration arms 31a and 31b obtain Coriolis forces in the directions of the flexural vibrations of arrow B and directions perpendicular to both directions of the Z-axis. As a result, as shown in FIG. 4, the connecting arms 35a and 35b perform vibrations as indicated by arrow C. The detection vibration arm 32 performs a flexural vibration as indicated by arrow D in conjunction with the vibrations (arrow C) of the connecting arms 35a and 35b. The flexural vibration of the detection vibration arm 32 and the flexural vibrations (excitation vibrations) of the drive vibration arms 31a and 31b which are associated with the Coriolis force are shifted in phase by 90 degrees.

Incidentally, when the magnitudes of vibrational energies or the magnitudes of vibration amplitudes in a case where the drive vibration arms 31a and 31b perform flexural vibrations (excitation vibrations) are equal to each other in the two drive vibration arms 31a and 31b, the balance between the vibrational energies of the drive vibration arms 31a and 31b is maintained, and the detection vibration arm 32 does not perform the flexural vibration in a state where an angular velocity is not applied to the sensor element 30. On the contrary, when the balance between the vibrational energies of the two drive vibration arms 31a and 31b is lost, the flexural vibration is generated in the detection vibration arm 32 even in a state where an angular velocity is not applied to the sensor element 30. This flexural vibration is called a leakage vibration, and is a flexural vibration of arrow D similar to the vibration based on the Coriolis force, but drive signals have the same phase.

Alternating-current charge based on the flexural vibrations is generated in the detection electrodes 44 and 45 of the detection vibration arm 32 as a detection signal due to a piezoelectric effect. Here, the alternating-current charge generated on the basis of the Coriolis force changes depending on the magnitude of the Coriolis force (in other words, magnitude of an angular velocity applied to the sensor element 30). On the other hand, alternating-current charge generated on the basis of the leakage vibration is constant irrespective of the magnitude of the angular velocity applied to the sensor element 30.

Meanwhile, rectangular weight portions 33 having a width larger than that of the drive vibration arms 31a and 31b are formed on the leading ends of the drive vibration arms 31a and 31b. The weight portions 33 are formed on the leading ends of the drive vibration arms 31a and 31b, and thus it is possible to increase the Coriolis force, and to obtain a desired resonance frequency in a relatively short vibrating arm. Similarly, weight portions 36 having a width larger than that of the detection vibration arm 32 are formed on the leading ends of the detection vibration arm 32. The weight portions 36 are formed on the leading ends of the detection vibration arm 32, and thus it is possible to increase the alternating-current charge generated in the detection electrodes 44 and 45.

In this manner, the sensor element 30 outputs the alternating-current charge (angular velocity component) based on the Coriolis force using the Z-axis as a detection axis and the alternating-current charge (vibration leakage component) based on the leakage vibration of the excitation vibration, through the detection electrodes 44 and 45.

Incidentally, a Coriolis force $F_c$ applied to the sensor element 30 is calculated by the following expression (1).

$$F_c = 2mv\Omega \quad (1)$$

In Expression (1), m is an equivalent mass, v is a vibration velocity, and $\Omega$ is an angular velocity. According to Expression (1), when the equivalent mass m or the vibration velocity v changes even in a case where the angular velocity $\Omega$ is constant, the Coriolis force changes accordingly. That is, the equivalent mass m or the vibration velocity v changes and thus the detection sensitivity of the angular velocity changes. When the vibrator element of the sensor element 30 changes in its vibration state due to a failure of some sort, the equivalent mass m or the vibration velocity v of the drive vibration changes, and thus the detection sensitivity changes. In addition, the state of the leakage vibration changes simultaneously, and thus the magnitude of the vibration leakage component also changes. That is, there is a correlation between the magnitude of the vibration leakage component and the detection sensitivity of the angular velocity, and the magnitude of the vibration leakage component is monitored, thereby allowing the presence or absence of the failure (also including disconnection) of the sensor element 30 to be determined.

Consequently, in the present embodiment, in order to secure high reliability by the failure of the sensor element 30 being able to be detected, the balance between vibrational energies of the drive vibration arms 31a and 31b is caused to collapse slightly, and thus the vibration leakage component of a desired level is positively generated. Particularly, in the present embodiment, since the sensor element 30 is formed using a double T-type vibrator element, laser beam machining or the like may make a distinction between the mass of the weight portion 33 of the leading end of the drive vibration arm 31a and the mass of the weight portion 33 of the leading end of the drive vibration arm 31b, thereby allowing the flexural vibration of the drive vibration arm 31a and the flexural vibration of the drive vibration arm 31b to be easily unbalanced.

Referring back to FIG. 1, the integrated circuit (IC) 10 includes the drive circuit 11, the detection circuit 12, a temperature sensor 13, a power supply voltage sensor 14, a reference voltage circuit 15, a serial interface circuit 16, a nonvolatile memory 17, a test control circuit 18, a terminal function switching circuit 19 and a fault diagnosis circuit 20. Meanwhile, the integrated circuit (IC) 10 of the present embodiment may be configured such that some of components shown in FIG. 1 are omitted or changed, or other components are added.

The reference voltage circuit 15 generates a constant current or a constant voltage such as a reference potential (analog ground voltage) from a power supply voltage which is supplied from the outside through a VDD terminal, and supplies the current or voltage to the drive circuit 11, the detection circuit 12, and the temperature sensor 13.

The nonvolatile memory 17 holds various trimming data (adjustment data or correction data) for the drive circuit 11, the detection circuit 12, and the temperature sensor 13. The nonvolatile memory 17 can be realized by, for example, a MONOS (Metal Oxide Nitride Oxide Silicon) type memory.

The temperature sensor 13 generates an analog signal ISO of which the voltage changes substantially linearly with a change in temperature. The temperature sensor 13 can be realized using, for example, a bandgap reference circuit.

The power supply voltage sensor 14 A/D-converts the power supply voltage which is supplied from the VDD terminal, and generates power supply voltage data VAM.

The drive circuit 11 generates a drive signal for performing an excitation vibration on the sensor element 30, and supplies the drive signal to a drive electrode 42 of the sensor element 30 through the DS terminal. In addition, the drive circuit 11 is supplied with a drive current (quartz crystal current), generated in a drive electrode 43 by the excitation vibration of the sensor element 30, through the DG terminal, and feedback-controls the amplitude level of the drive signal so that the amplitude of the drive current is held constant. In addition, the drive circuit 11 generates a signal SDET having the same phase as that of the drive signal and a signal SDET90 having a phase shifted by 90 degrees with respect to that of the drive signal, and supplies these signals to the detection circuit 12.

The detection circuit 12 (an example of a physical quantity detection circuit) is supplied with alternating-current charges (detection currents) Q1 and Q2, respectively generated in two detection electrodes 44 and 45 of the sensor element 30, through an S1 terminal and an S2 terminal, detects angular velocity components contained in the alternating-current charges Q1 and Q2 when a TEST signal is inactive, and generates angular velocity data OUT (an example of physical quantity data) having digital codes according to the magnitudes of the angular velocity components. In addition, the detection circuit 12 detects vibration leakage components contained in the alternating-current charges Q1 and Q2 when the TEST signal is active, and generates data having digital codes according to the magnitudes of the vibration leakage components as the angular velocity data OUT. As described later, in a process of generating the angular velocity data OUT, the detection circuit 12 performs offset correction and sensitivity correction using the output signal TSO of the temperature sensor 13, the power supply voltage data VAM which is output by the power supply voltage sensor 14, and the trimming data stored in the nonvolatile memory 17. The angular velocity data OUT which is generated by the detection circuit 12 is supplied to the serial interface circuit 16.

The fault diagnosis circuit 20 determines whether the code of the angular velocity data OUT which is output by the detection circuit 12 is within a desired range when the TEST signal is active, and then diagnoses the code as being normal when it is within the range, diagnoses the code as being abnormal when it is out of the range, and outputs a flag signal (FLAG) indicating a diagnostic result.

The serial interface circuit 16 is supplied with a selection signal, a clock signal, and a serial input signal, respectively, through an SS terminal, a SCLK terminal, and an SI terminal. The serial interface circuit 16 samples the serial input signal using the clock signal when the selection signal is enabled, and performs a process of analyzing a command contained in the serial input signal or a process of converting serial data contained in the serial input signal into parallel data. Further, the serial interface circuit 16 performs a process of writing (setting) and reading data to and from the nonvolatile memory 17 or an internal register (not shown), in accordance with the command. In addition, the serial interface circuit 16 converts the angular velocity data OUT generated by the detection circuit 12, the flag signal (FLAG) of the diagnostic result of the fault diagnosis circuit 20, the data which is read out from the nonvolatile memory 17 or the internal register, and the like into serial data, and performs a process of outputting the converted resultants to the outside through an SO terminal.

The terminal function switching circuit 19 switches connection destinations of four terminals of 101, 102, 103, and 104. For example, the terminal function switching circuit 19 can select output signals or internal signals of the drive circuit 11, the detection circuit 12, and the reference voltage circuit 15, under the control of the test control circuit 18, output any of 101, 102, 103, and 104 to the outside, or supply signals which are input from any of 101, 102, 103, and 104 to the outside, to the drive circuit 11, the detection circuit 12, and the reference voltage circuit 15.

The test control circuit 18 controls the switching of the connection destinations of four terminals of 101, 102, 103, and 104 in accordance with setting values received from the serial interface circuit 16, and generates a control signal (TEST) for controlling whether a fault diagnosis is performed.

Figure 5:
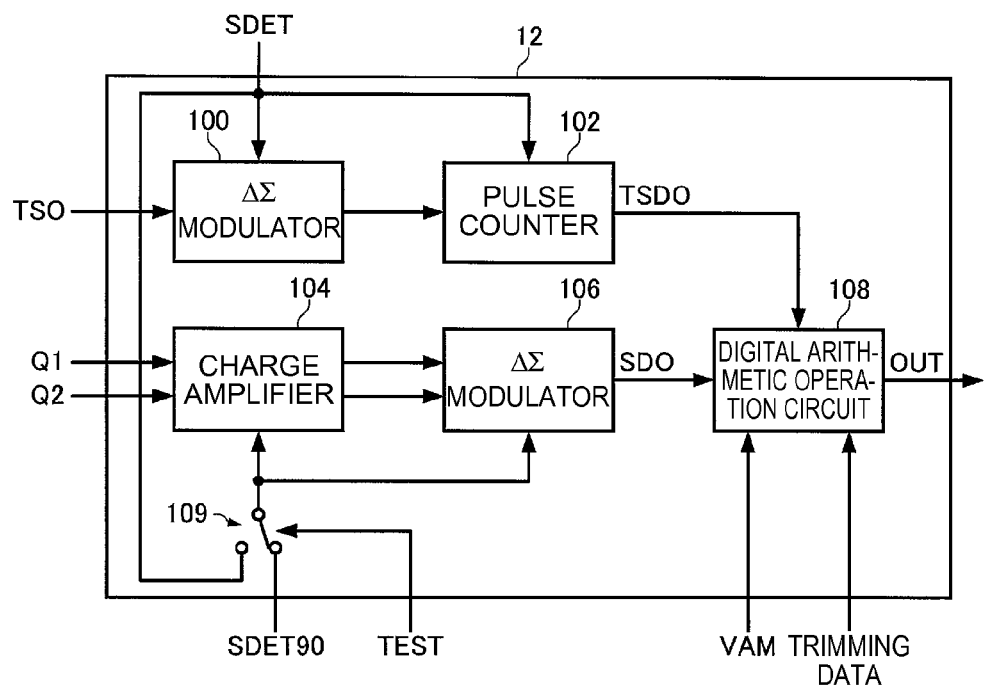
FIG. 5 is a diagram illustrating a configuration example of a detection circuit.

FIG. 5 is a diagram illustrating a configuration example of the detection circuit 12. As shown in FIG. 5, the detection circuit 12 includes a $\Delta\Sigma$ modulator 100, a pulse counter 102, a charge amplifier 104, a $\Delta\Sigma$ modulator 106 as an A/D converter, a digital arithmetic operation circuit 108 and a switch circuit 109. Meanwhile, the detection circuit 12 of the present embodiment may be configured such that some of components shown in FIG. 5 are omitted or changed, or other components are added.

The $\Delta\Sigma$ modulator 100 converts the output signal TSO of the temperature sensor 13 into 1-bit bitstream data, using the signal SDET generated by the drive circuit 11 as a sampling clock.

The pulse counter 102 adds bit stream data which is output by the $\Delta\Sigma$ modulator 100 in order in synchronization with the signal SDET generated by the drive circuit 11, and generates temperature data TSDO.

The switch circuit 109 selects and outputs the signal SDET90 (signal having a phase shifted by 90 degrees with respect to that of the drive signal) generated by the drive circuit 11 when the TEST signal is inactive, and selects and outputs the signal SDET (signal having the same phase as that of the drive signal) generated by the drive circuit 11 when the TEST signal is active.

The charge amplifier 104 integrates the alternating-current charges Q1 and Q2 generated from two detection electrodes of the sensor element 30 in synchronization with the output signal of the switch circuit 109, and outputs a differential voltage. That is, the charge amplifier 104 integrates the alternating-current charges Q1 and Q2 in synchronization with the signal SDET90 when the TEST signal is inactive, and integrates the alternating-current charges Q1 and Q2 in synchronization with the signal SDET when the TEST signal is active. As described above, in the sensor element 30, the flexural vibration of the detection vibration arm 32 and the flexural vibrations (excitation vibrations) of the drive vibration arms 31*a* and 31*b* which are associated with the Coriolis force are shifted in phase by 90 degrees, and thus the charge amplifier 104 integrates the alternating-current charge (angular velocity component) based on the Coriolis force when the TEST signal is inactive. However, the leakage vibration component has the same phase as that of the drive signal, and thus is not integrated in an ideal case. Therefore, only the angular velocity component is contained in the differential voltage which is output by the charge amplifier 104 in an ideal case. On the other hand, when the TEST signal is active, the charge amplifier 104 integrates the leakage vibration component, but does not integrate the angular velocity component. Therefore, only the leakage vibration component is contained in the differential voltage which is output by the charge amplifier 104.

The $\Delta\Sigma$ modulator 106 converts the differential voltage (angular velocity component) which is output by the charge amplifier 104 into 1-bit bitstream data SDO, using the output signal (SDET90 or SDET) of the switch circuit 109 as a sampling clock. In other words, the $\Delta\Sigma$ modulator 106 used as an A/D converter periodically samples the differential voltage (angular velocity component) which is output by the detection charge amplifier 104 to perform the digitization thereof, and converts the digitized differential voltage into the 1-bit bitstream data SDO.

The digital arithmetic operation circuit 108 performs a predetermined arithmetic operation process on the bit stream data SDO which is output by the ΔΣ modulator 106, using the temperature data TSDO generated by the pulse counter 102, the power supply voltage data VAM generated by the power supply voltage sensor 14, and the trimming data stored in the nonvolatile memory 17, and generates the angular velocity data OUT having a digital code according to the magnitude of the angular velocity component or the leakage vibration component.

Figure 6:
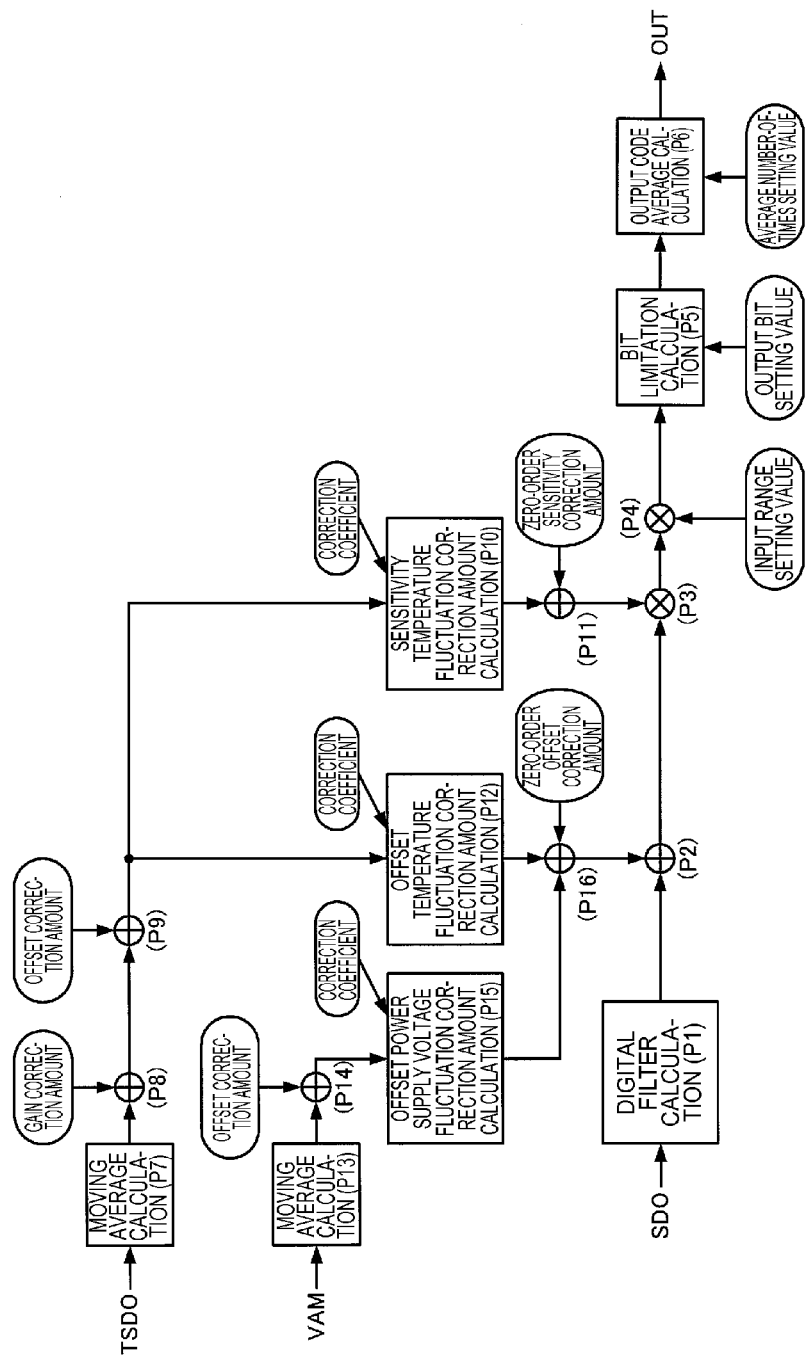
FIG. 6 is a diagram illustrating a flow of arithmetic operation processes performed by a digital arithmetic operation circuit.

FIG. 6 is a diagram illustrating a flow of arithmetic operation processes performed by the digital arithmetic operation circuit 108. As shown in FIG. 6, the digital arithmetic operation circuit 108 performs digital filter calculation (P1) of cutting a high frequency component with respect to the 1-bit bitstream data SDO, and generates angular velocity data.

In addition, the digital arithmetic operation circuit 108 performs offset correction calculation (P2) of adding an offset correction amount and a sensitivity correction calculation (P3) of multiplying a sensitivity correction amount, with respect to the angular velocity data generated by the digital filter calculation (P1).

In addition, the digital arithmetic operation circuit 108 multiplies the angular velocity data, on which the offset correction calculation (P2) and the sensitivity correction calculation (P3) are performed, by an input range setting value, and performs input range calculation (P4) of adjusting an output range of angular velocity data which is output by the physical quantity detection device 1 to an input range of an IC connected to the latter stage of the physical quantity detection device 1.

In addition, the digital arithmetic operation circuit 108 performs bit limitation calculation (P5) of rounding off a least significant bit by cutting (shifting) a low-order bit of the number of bits according to the output bit setting value, with respect to the angular velocity data on which the input range calculation (P4) is performed.

In addition, the digital arithmetic operation circuit 108 performs output code average calculation (P6) of calculating an average value of N pieces of angular velocity data on which the bit limitation calculation (P5) is performed, in accordance with an average number-of-times setting value. The angular velocity data OUT is obtained by the output code average calculation (P6).

Further, the digital arithmetic operation circuit 108 performs the calculation of the offset correction amount used in the offset correction calculation (P2) and the calculation of the sensitivity correction amount used in the sensitivity correction calculation (P3).

Specifically, the digital arithmetic operation circuit 108 calculates a moving average of the predetermined number of times (for example, four times) with respect to the temperature data TSDO (P7), and performs addition (P8) of a gain correction amount and addition (P9) of the offset correction amount, with respect to the calculation result of the moving average.

In addition, the digital arithmetic operation circuit 108 substitutes the temperature data on which the moving average (P7), the gain correction (P8) and the offset correction (P9) are performed, into a temperature variable of a correction expression (sensitivity temperature fluctuation correction expression) for correcting the sensitivity variable of the angular velocity data due to a fluctuation in temperature, and performs sensitivity temperature fluctuation correction amount calculation (P10) of obtaining a correction amount (sensitivity temperature fluctuation correction amount) of a fluctuation in sensitivity due to the fluctuation in temperature.

In addition, the digital arithmetic operation circuit 108 adds the sensitivity temperature fluctuation correction amount and a zero-order sensitivity correction amount (sensitivity correction amount independent of temperature) and performs sensitivity correction amount calculation (P11) of obtaining a sensitivity correction amount.

In addition, the digital arithmetic operation circuit 108 substitutes the temperature data on which the moving average (P7), the gain correction (P8) and the offset correction (P9) are performed, into a temperature variable of a correction expression (offset temperature fluctuation correction expression) for correcting a fluctuation in offset of the angular velocity data due to a fluctuation in temperature, and performs offset temperature fluctuation correction amount calculation (P12) of obtaining a correction amount (offset temperature fluctuation correction amount) of the fluctuation in offset due to the fluctuation in temperature.

In addition, the digital arithmetic operation circuit 108 calculates a moving average of the predetermined number of times (for example, four times) with respect to the power supply voltage data VAM (P13), and performs addition (P14) of the offset correction amount with respect to the calculation result of the moving average.

In addition, the digital arithmetic operation circuit 108 substitutes the power supply voltage data on which the moving average (P13) and the offset correction (P14) are performed, into a temperature variable of a correction expression (offset power supply voltage fluctuation correction expression) for correcting a fluctuation in offset of the angular velocity data due to a fluctuation in power supply voltage, and performs offset power supply voltage fluctuation correction amount calculation (P15) of obtaining a correction amount (offset power supply voltage fluctuation correction amount) of the fluctuation in offset due to the fluctuation in power supply voltage.

In addition, the digital arithmetic operation circuit 108 adds the offset temperature fluctuation correction amount, the offset power supply voltage fluctuation correction amount, and a zero-order offset correction amount (offset correction amount independent of temperature and power supply voltage) and performs offset correction amount calculation (P16) of obtaining an offset correction amount.

Meanwhile, the gain correction amount and the offset correction amount of the temperature data, the offset correction amount of the power supply voltage data, the correction coefficients of the sensitivity temperature fluctuation correction expression, the correction coefficients of the offset temperature fluctuation correction expression, the correction coefficients of the offset power supply voltage fluctuation correction expression, the zero-order offset correction amount, the zero-order sensitivity correction amount, the input range setting value, the output bit setting value, and the average number-of-times setting value are a portion of the trimming data stored in the nonvolatile memory 17.

Meanwhile, the arithmetic operations of P1 to P6 shown in FIG. 6 are performed whenever the bit stream data SDO is updated, that is, at the same rate as the sampling rate (for example, approximately 3 kHz) of the ΔΣ modulator 106. On the other hand, since the fluctuation in temperature or the fluctuation in power supply voltage is sufficiently delayed with respect to a change in angular velocity, the arithmetic operations P7 to P16 shown in FIG. 6 are performed at a lower rate (for example, approximately 12 Hz).

As described above, when the TEST signal is inactive, only the angular velocity component is contained in the differential voltage which is output by the charge amplifier 104 in an ideal case. However, in reality, a fluctuation in power supply voltage causes the phase of SDET90 to shift slightly, and thus the leakage vibration component is integrated by the charge amplifier 104. Furthermore, in the present embodiment, in order to secure high reliability by the failure of the sensor element 30 being able to be detected, the vibration leakage component of a desired level is positively generated. Therefore, even when the phase of SDET90 shifts only slightly, a large leakage vibration component is contained in the differential voltage which is output by the charge amplifier 104. Therefore, a fluctuation in power supply voltage causes the angular velocity data OUT to fluctuate even when the sensor element 30 detects a constant angular velocity. In addition, factors in the fluctuation in angular velocity data OUT due to the fluctuation in power supply voltage include various circuit factors other than the leakage vibration component.

Figure 7:
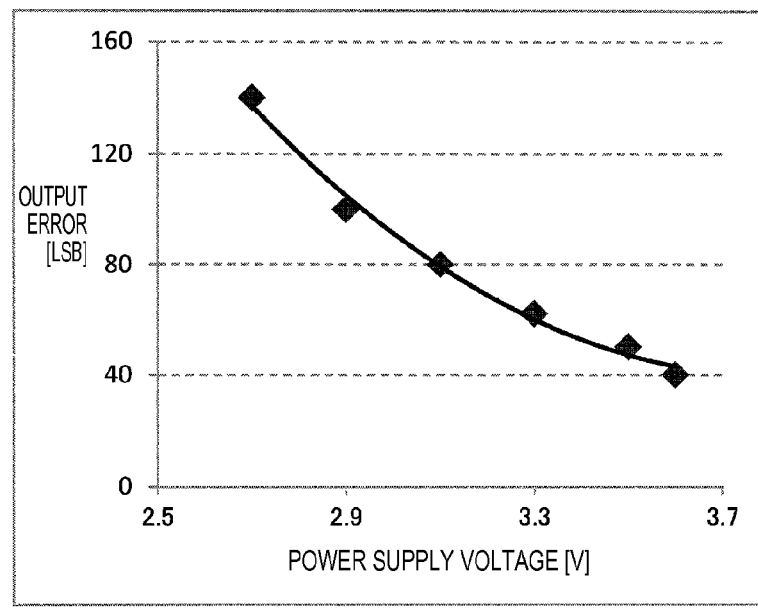
FIG. 7 is a diagram illustrating an example of the power supply voltage fluctuation characteristics of angular velocity data before correction.
Figure 8:
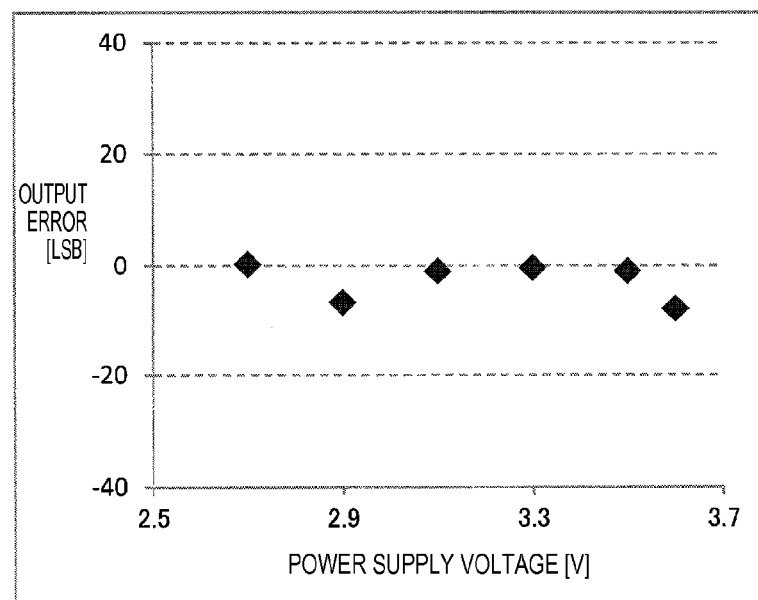
FIG. 8 is a diagram illustrating an example of the power supply voltage fluctuation characteristics of the angular velocity data after correction.

FIG. 7 is a diagram illustrating an example of the power supply voltage fluctuation characteristics of the angular velocity data OUT. In FIG. 7, the horizontal axis represents a power supply voltage, and the vertical axis represents an output error (error of angular velocity data for a zero-point ideal value). In the example of FIG. 7, measurement at six points in the range of 2.6 V to 3.7 V is performed in which the angular velocity data varies by approximately 100 LSB, and the offset of approximately 45 LSB is present at 3.3 V which is a reference voltage. The power supply voltage fluctuation characteristics of the angular velocity data can be approximated by a quadratic function indicated by a solid line. FIG. 8 is a diagram illustrating the power supply voltage fluctuation characteristics of the angular velocity data OUT after the power supply voltage characteristics shown in FIG. 7 are corrected by a function which is opposite in sign to the quadratic function indicated by the solid line of FIG. 7 so that an error at 3.3 V becomes 0. In FIG. 8, the horizontal axis represents a power supply voltage, and the vertical axis represents an output error. As shown in FIG. 8, in the range of 2.6 V to 3.7 V, the error of the angular velocity data falls within 10 LSB. That is, a fluctuation in the offset of the angular velocity data due to the fluctuation in power supply voltage can be accurately corrected by a quadratic correction expression.

Consequently, in the present embodiment, the power supply voltage fluctuation characteristics of the angular velocity data OUT are measured at a reference temperature (for example, 25° C.) in a process of inspecting the physical quantity detection device 1, and the like, a quadratic correction expression, indicated in the following expression (2), using power supply voltage data V as a variable is calculated, and correction coefficients a and b and a zero-order offset correction amount (offset correction amount at reference voltage and reference temperature (for example, 3.3 V, 25° C.)) c are stored in the nonvolatile memory 17.

$$a*V^2+b*V+c \quad (2)$$

During the actual operation of the physical quantity detection device 1, the digital arithmetic operation circuit 108 obtains the offset power supply voltage fluctuation correction amount by calculating the correction expression of Expression (2) (offset power supply voltage fluctuation correction expression) using the correction coefficients a and b and the power supply voltage data VAM which is output by the power supply voltage sensor 14, in the offset power supply voltage fluctuation correction amount calculation (P15) of FIG. 6. The digital arithmetic operation circuit 108 obtains an offset correction amount by adding the offset power supply voltage fluctuation correction amount, the offset temperature fluctuation correction amount and the zero-order offset correction amount c in the offset correction amount calculation (P16) of FIG. 6, and adds the offset correction amount to the angular velocity data in the offset correction calculation (P2) of FIG. 6. Thereby, the digital arithmetic operation circuit 108 simultaneously corrects a fluctuation in offset due to the fluctuation in power supply voltage, a fluctuation in offset due to the fluctuation in temperature, and an offset error at the reference voltage, with respect to the angular velocity data.

In the present embodiment, the power supply voltage sensor 14 measures a power supply voltage intermittently for every 256 periods of a sampling clock (clock having the same rate as that of SDET90), and the digital arithmetic operation circuit 108 also performs the offset power supply voltage fluctuation correction amount calculation (P15) intermittently in the same period.

Figure 9:
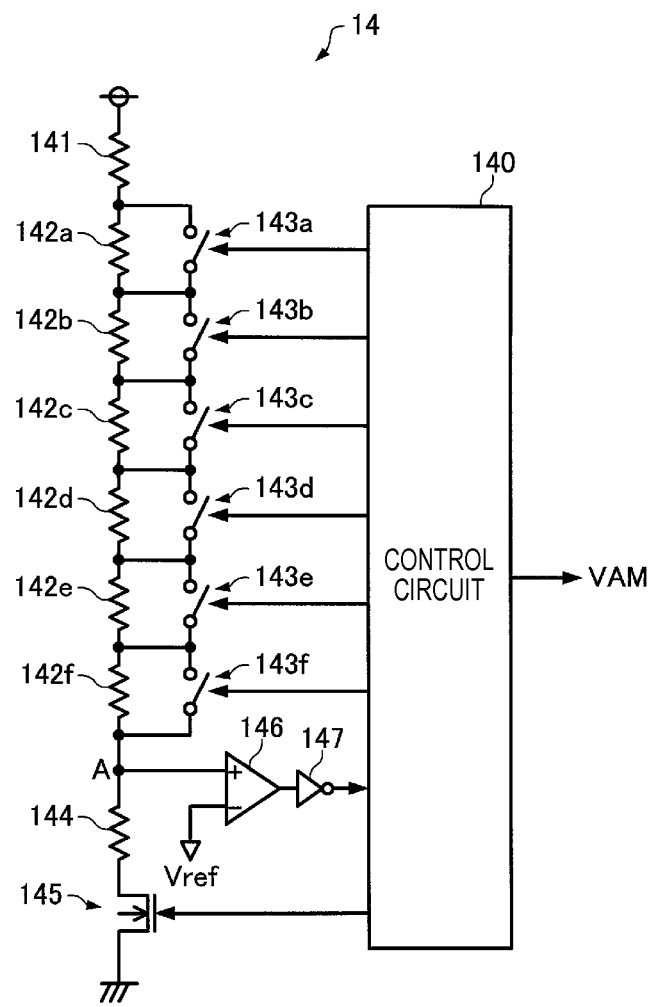
FIG. 9 is a diagram illustrating a configuration example of a power supply voltage sensor.

It is considered that the power supply voltage sensor 14 has various circuit configurations. FIG. 9 illustrates a circuit configuration of the power supply voltage sensor 14 capable of being realized in a relatively small circuit scale. The power supply voltage sensor 14 shown in FIG. 9 includes a control circuit 140, a resistor 141, resistors 142a to 142f, switches 143a to 143f, a resistor 144, an NMOS transistor 145, a comparator 146, and an inverter 147. The resistor 141, the resistors 142a to 142f, the resistor 144, and the NMOS transistor 145 are connected in this order in series between a power supply and a ground. The switches 143a to 143f are respectively connected in parallel with the resistors 142a to 142f. The comparator 146 compares a voltage of a connection point (point A) between the resistor 142f and the resistor 144 with a reference voltage Vref. An output signal of the comparator 146 is input to the control circuit 140 through the inverter 147. The control circuit 140 controls the ON/OFF of the switches 143a to 143f and the ON/OFF of the NMOS transistor 145.

The power supply voltage sensor 14 measures a power supply voltage with a 6-bit resolution with respect to a desired power supply voltage range, on the basis of the control performed by the control circuit 140. When the measurement of power supply voltage is performed, the control circuit 140 turns on the NMOS transistor 145. The control circuit 140 first sets a control code of six switches 143a to 143f to "100000", and compares a voltage of the point A with the reference voltage Vref by the comparator 146. When the voltage of the point A is higher than Vref, the control circuit 140 sets the control code of the switches 143a to 143f to "110000", and compares the voltage of the point A with the reference voltage Vref by the comparator 146. On the other hand, when the voltage of the point A is lower than Vref, the control circuit 140 sets the control code of the switches 143a to 143f to "010000", and compares the voltage of the point A with the reference voltage Vref by the comparator 146. The control circuit 140 repeats such a dichotomizing search, and thus fixes the control code of the switches 143a to 143f so that two input differences of the comparator 146 approach closest to each other. The control circuit 140 converts the fixed 6-bit control code into 7-bit power supply voltage data VAM which is equal to 0 when the power supply voltage is a desired voltage, has a sign which is set to be positive when the voltage is higher than the desired voltage, and has a sign which is set to be negative when the voltage is lower than the desired voltage, and the control circuit outputs the converted data. The control circuit 140 performs such a measurement of the power supply voltage intermittently for every 256 periods of a sampling clock. When the measurement of the power supply voltage is not performed, the control circuit 140 turns off the NMOS transistor 145 so that useless current consumption is not generated.

Figure 10:
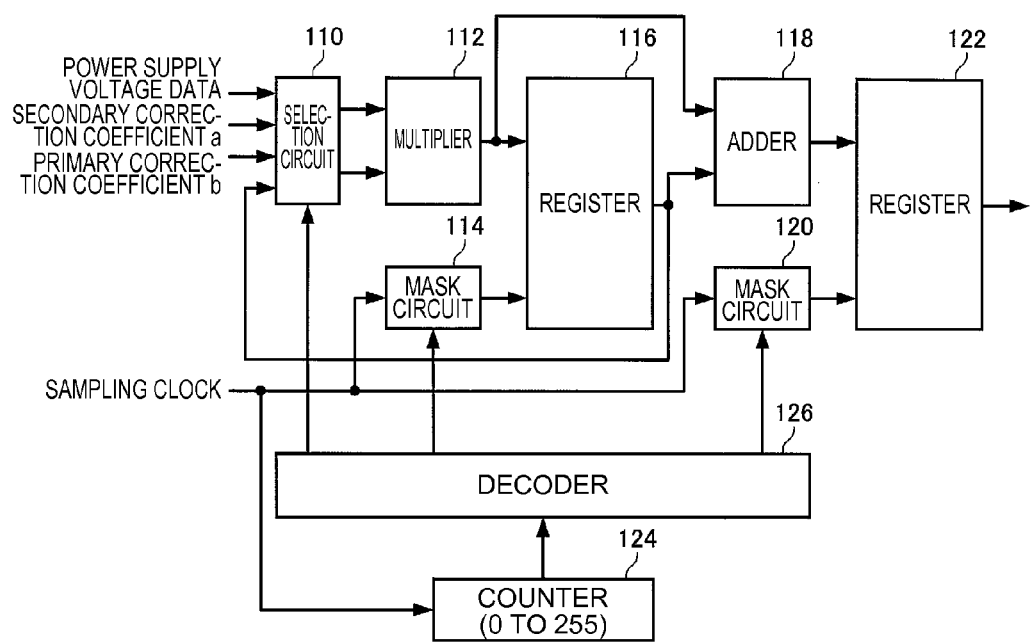
FIG. 10 is a diagram illustrating a configuration example of a circuit that performs offset power supply voltage fluctuation correction amount calculation.

FIG. 10 is a diagram illustrating a configuration example of a circuit that performs the offset power supply voltage fluctuation correction amount calculation (P15).

A selection circuit 110 selects and outputs two from power supply voltage data (power supply voltage data after the offset correction amount addition (P14) is performed), correction coefficients a and b of the offset power supply voltage fluctuation correction expression, and data held in a register 116, in accordance with a control signal.

A multiplier 112 multiplies and outputs two pieces of output data of the selection circuit 110.

A mask circuit 114 propagates a sampling clock to an output or does not propagate the sampling clock to an output by masking, in accordance with the control signal.

The register 116 holds output data of the multiplier 112 in an edge of the sampling clock propagated through the mask circuit 114.

An adder 118 adds the output data of the multiplier 112 and the data held in the register 116, and outputs the added data.

A mask circuit 120 propagates a sampling clock to an output or does not propagate the sampling clock to an output by masking, in accordance with the control signal.

A register 122 holds the output data of the adder 118 in the edge of the sampling clock propagated through the mask circuit 120. The data held by the register 122 serves as the offset power supply voltage fluctuation correction amount.

A counter 124 repeatedly counts 0 to 255 for each edge of the sampling clock.

A decoder 126 decodes a count value of the counter 124, and generates a control signal of the selection circuit 110 so that the selection circuit 110 selects the power supply voltage data together with two pieces of output data when the count value is 0, the selection circuit 110 selects the secondary correction coefficient a and the data held in the register 116 as two pieces of output data when the count value is 1, and the selection circuit 110 selects the primary correction coefficient b and the power supply voltage data as two pieces of output data when the count value is equal to or greater than 2. In addition, the decoder 126 generates a control signal of the mask circuit 114 so that the mask circuit 114 propagates a sampling clock to an output when the count value is 0 or 1 and the mask circuit 114 does not propagate the sampling clock to an output by masking when the count value is equal to or greater than 2. In addition, the decoder 126 generates a control signal of the mask circuit 120 so that the mask circuit 120 propagates a sampling clock to an output when the count value is 2 and the mask circuit 120 does not propagate the sampling clock to an output by masking when the count value is other than 2.

With such a configuration, when the count value of the counter 126 is 0, $V^2$ of Expression (2) is calculated by the multiplier 112, and the multiplication result is held in the register 116 in the edge of the sampling clock. Next, when the count value of the counter 126 is 1, $a*V^2$ of Expression (2) is calculated by the multiplier 112, and the multiplication result is held in the register 116 in the edge of the sampling clock. Next, when the count value of the counter 126 is 2, $b*V$ of Expression (2) is calculated by the multiplier 112, $a*V^2+b*V$ of Expression (2) is further calculated by the adder 118, and the addition result is held in the register 122 in the edge of the sampling clock. The register 122 is not updated until the edge of the sampling clock when the count value of the counter 126 is 2 subsequently. Thereby, the digital arithmetic operation circuit 108 performs the offset power supply voltage fluctuation correction amount calculation (P15) intermittently for every 256 periods of the sampling clock.

As described above, the digital arithmetic operation circuit 108 performs the offset correction amount calculation (P16) subsequently to the offset power supply voltage fluctuation correction amount calculation (P15), and calculates the offset correction amount. This offset correction amount calculation (P16) is also performed intermittently for every 256 periods of the sampling clock. The digital arithmetic operation circuit 108 performs the offset correction calculation (P2) on the angular velocity data for each period of the sampling clock, and simultaneously corrects a fluctuation in offset due to the fluctuation in power supply voltage, a fluctuation in offset due to the fluctuation in temperature, and an offset error at the reference voltage.

Figure 11:
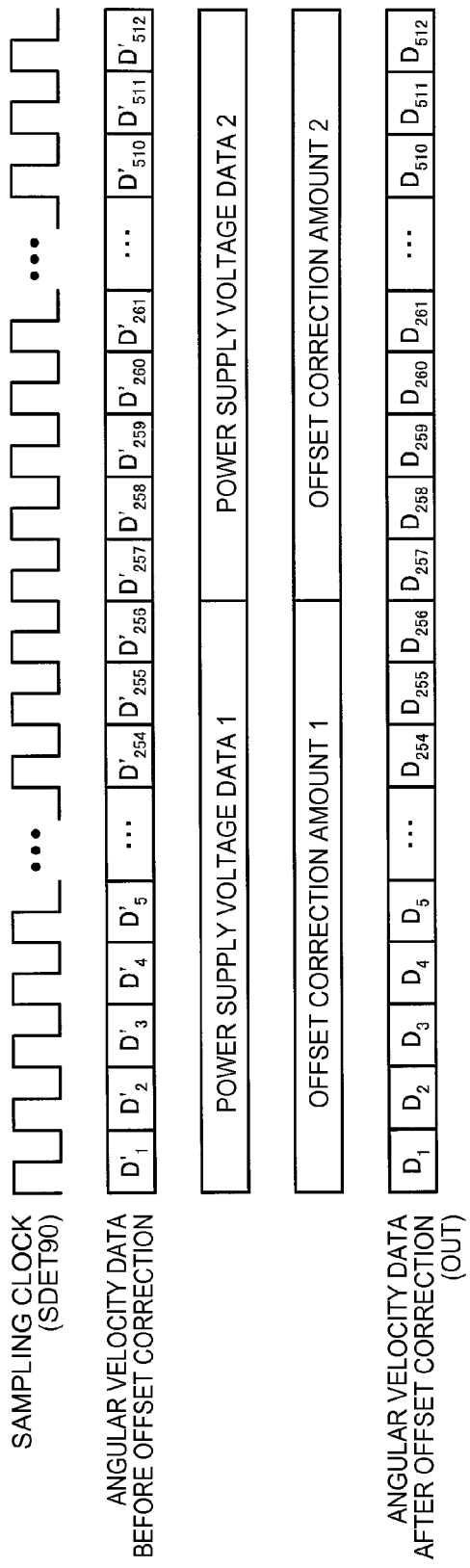
FIG. 11 is a timing chart diagram illustrating an example of update timings of power supply voltage data, offset correction amounts and angular velocity data.

FIG. 11 is a timing chart diagram illustrating an example of update timings of power supply voltage data, offset correction amounts and angular velocity data. As shown in FIG. 11, the angular velocity data is updated for each period of the sampling clock, whereas the power supply voltage data and the offset correction amounts are updated for every 256 periods of the sampling clock.

As described above, according to the physical quantity detection device (physical quantity detection circuit) of the present embodiment, the fluctuation in offset of the angular velocity data due to the fluctuation in power supply voltage can be accurately corrected on the basis of the quadratic correction expression using the power supply voltage as a variable.

In addition, according to the physical quantity detection device (physical quantity detection circuit) of the present embodiment, the correction of the fluctuation in offset of the angular velocity data due to the fluctuation in power supply voltage is performed by digital processing, and thus it is possible to increase correction accuracy.

In addition, according to the physical quantity detection device (physical quantity detection circuit) of the present embodiment, the correction of the fluctuation in offset of the angular velocity data due to the fluctuation in power supply voltage is performed intermittently at a sufficiently lower rate than a sampling rate, and thus it is possible to considerably reduce the amount of calculation of the correction expression and power consumption.

2. Electronic Apparatus

Figure 12:
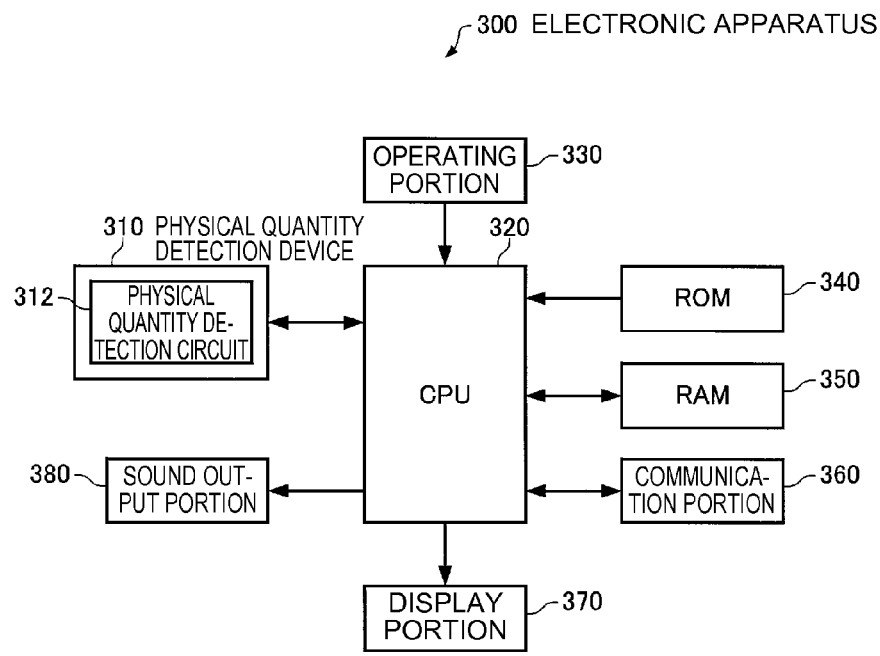
FIG. 12 is a functional block diagram of an electronic apparatus according to the present embodiment.
Figure 13:
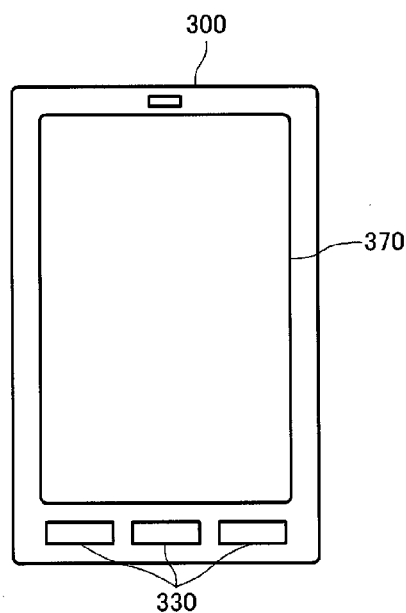
FIG. 13 is a diagram illustrating an example of the appearance of the electronic apparatus according to the present embodiment.

FIG. 12 is a functional block diagram of an electronic apparatus according to the present embodiment. In addition, FIG. 13 is a diagram illustrating an example of the appearance of a smartphone which is an example of the electronic apparatus according to the present embodiment.

An electronic apparatus 300 according to the present embodiment includes a physical quantity detection device 310, a CPU (Central Processing Unit) 320, an operating portion 330, a ROM (Read Only Memory) 340, a RAM (Random Access Memory) 350, a communication portion 360, a display portion 370, and a sound output portion 380. Meanwhile, the electronic apparatus according to the present embodiment has a configuration in which some of components (respective portions) of FIG. 12 are omitted or changed, or may have a configuration in which other components are added.

The physical quantity detection device 310 is a device that detects a physical quantity and outputs a signal (arithmetic operation signal) of a level depending on the detected physical quantity. The physical quantity detection device may be an inertial sensor that detects at least a portion of physical quantities such as, for example, an acceleration, an angular velocity, a velocity, an angular acceleration, and a force, and may be a clinometer that measures the angle of inclination. As the physical quantity detection device 310, for example, the physical quantity detection device 1 of the present embodiment mentioned above can be applied. In addition, the physical quantity detection device 310 includes a physical quantity detection circuit 312. As the physical quantity detection circuit 312, for example, the detection circuit 12 of the present embodiment mentioned above can be applied.

The CPU 320 performs various types of computation processes and control processes using the arithmetic operation signal which is output by the physical quantity detection device 310, in accordance with a program stored in the ROM 340 or the like. Besides, the CPU 320 performs various types of processes in response to an operation signal from the operating portion 330, a process of controlling the communication portion 360 in order to perform data communication with the outside, a process of transmitting a display signal for causing the display portion 370 to display a variety of information, a process of causing the sound output portion 380 to output various types of sounds, and the like.

The operating portion 330 is an input device constituted by operation keys, button switches or the like, and outputs an operation signal in response to a user's operation to the CPU 320.

The ROM 340 stores programs, data or the like for causing the CPU 320 to perform various types of computation processes and control processes.

The RAM 350 is used as a work area of the CPU 320, and temporarily stores programs and data which are read out from the ROM 340, data which is input from the operating portion 330, arithmetic operation results executed by the CPU 320 in accordance with various types of programs, and the like.

The communication portion 360 performs a variety of control for establishing data communication between the CPU 320 and an external device.

The display portion 370 is a display device constituted by an LCD (Liquid Crystal Display), an organic EL display or the like, and displays a variety of information on the basis of a display signal which is input from the CPU 320. The display portion 370 may be provided with a touch panel functioning as the operating portion 330.

The sound output portion 380 is a device that outputs a sound of a speaker or the like.

The detection circuit 12 of the present embodiment mentioned above is incorporated as the physical quantity detection circuit 312, thereby allowing an electronic apparatus having high reliability to be realized at a low cost.

As such an electronic apparatus 300, various electronic apparatuses are considered. For example, the electronic device includes a personal computer (for example, mobile-type personal computer, laptop personal computer, notebook type personal computer or tablet personal computer), a mobile terminal such as a cellular phone, a digital still camera, an ink jet ejecting apparatus (for example, ink jet printer), a storage area network device such as a router or a switch, a local area network device, a television, a video camera, a video tape recorder, a car navigation device, a pager, an electronic notebook (also including a communication function), an electronic dictionary, an electronic calculator, an electronic game console, a game controller, a word processor, a workstation, a TV phone, a security TV monitor, electronic binoculars, a POS terminal, a medical instrument (for example, electronic thermometer, sphygmomanometer, blood glucose monitoring system, electrocardiogram measurement device, ultrasound diagnostic device, and electronic endoscope), a fish finder, various types of measuring apparatus, meters and gauges (for example, meters and gauges of a vehicle, an aircraft, and a vessel), a flight simulator, a head mounted display, a motion tracer, a motion tracker, a motion controller, PDR (walker position and direction measurement), and the like.

3. Moving Object

Figure 14:
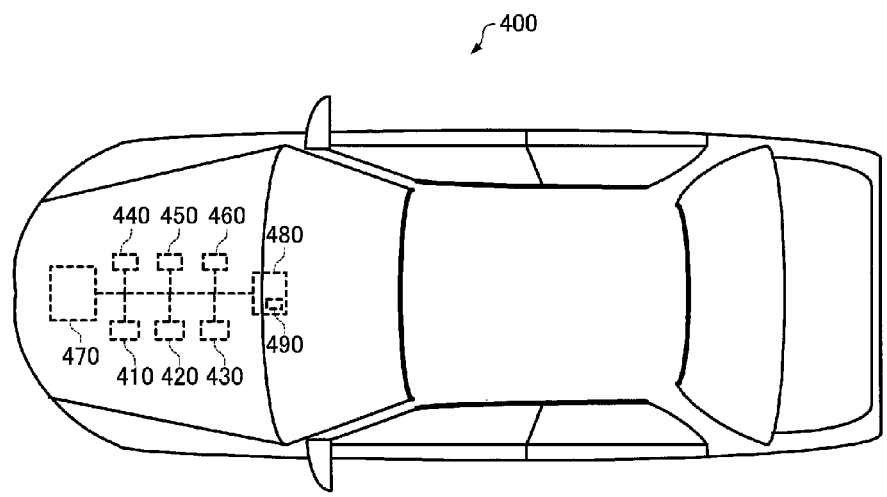
FIG. 14 is a diagram illustrating an example of a moving object according to the present embodiment.

FIG. 14 is a diagram (top view) illustrating an example of a moving object according to the present embodiment. A moving object 400 shown in FIG. 14 includes physical quantity detection devices 410, 420, and 430, controllers 440, 450, and 460, a battery 470, and a navigation device 480. Meanwhile, the moving object according to the present embodiment may have a configuration in which some of the components (respective portions) of FIG. 14 are omitted or changed, and may have a configuration in which other components are added.

The physical quantity detection devices 410, 420, and 430, the controllers 440, 450, and 460, and the navigation device 480 operate through a power supply voltage supplied from the battery 470.

The controllers 440, 450, and 460 perform a variety of control of a posture control system, a lateral turning prevention system, a brake system and the like using some or all of arithmetic operation signals which are output by the physical quantity detection devices 410, 420, and 430.

The navigation device 480 displays the position and time of the moving object 400 and a variety of other information on a display device, on the basis of output information of a built-in GPS receiver (not shown). In addition, the navigation device 480 has a physical quantity detection device 490 built-in, performs the calculation of the position and direction of the moving object 400 on the basis of an output signal of the physical quantity detection device 490 even when GPS radio waves are out of reach, and continuously displays necessary information.

The physical quantity detection devices 410, 420, 430, and 490 are devices that output signals (arithmetic operation signals) of levels depending on the detected physical quantities, and are, for example, an angular velocity sensor, an acceleration sensor, a velocity sensor, and a clinometer, respectively. The physical quantity detection devices 410, 420, 430, and 490 include a physical quantity detection circuit (not shown) that corrects an output signal of a sensor element (not shown) due to a change in temperature or power supply voltage and outputs an arithmetic operation signal.

For example, the detection circuit 12 according to the present embodiment mentioned above can be applied as the physical quantity detection circuit included in the physical quantity detection devices 410, 420, 430, and 490, or, the physical quantity detection device 1 according to the present embodiment mentioned above can be applied as the physical quantity detection devices 410, 420, 430, and 490, thereby allowing high reliability to be secured at a low cost.

Various moving objects are considered as such a moving object 400. The moving object includes, for example, an automobile (also including an electric automobile), an aircraft such as a jet engine airplane or a helicopter, a vessel, a rocket, a satellite, and the like.

Meanwhile, the invention is not limited to the present embodiment, but various changes and modifications can be made without departing from the scope of the invention.

For example, in the present embodiment, the offset power supply voltage fluctuation correction amount calculation (P15) is performed by digital processing, but may be performed by an analog circuit. For example, a secondary voltage generation circuit that generates a secondary voltage of the power supply voltage, a primary voltage generation circuit that generates a primary voltage of the power supply voltage, and an analog addition circuit that adds the secondary voltage and the primary voltage are provided, and each gain of the secondary voltage generation circuit and the primary voltage generation circuit is adjusted in accordance with a secondary coefficient a and a primary coefficient b of Expression (2), thereby allowing the offset power supply voltage fluctuation correction amount calculation (P15) to be realized by an analog circuit.

In addition, for example, the vibrator element of the sensor element 30 may not be a double T type, may be, for example, a tuning fork type or a sinking comb type, and may be a tuning bar type having a shape such a triangular prism, a quadrangular prism, a cylindrical shape or the like. In addition, materials of the vibrator element of the sensor element 30 to be used may include, for example, piezoelectric materials of piezoelectric single crystal such as lithium tantalate ($LiTaO_3$) or lithium niobate ($LiNbO_3$), piezoelectric ceramics such as lead zirconate titanate (PZT), and the like instead of quartz crystal ($SiO_2$), and may include a silicon semiconductor. In addition, for example, a structure may be used in which a piezoelectric thin film such as zinc oxide (ZnO) or aluminum nitride (AlN) interposed in a drive electrode is disposed in a portion of the surface of a silicon semiconductor.

In addition, for example, the sensor element 30 is not limited to a piezoelectric sensor element, but may be a vibrating type sensor element such as an electrodynamic type, a capacitance type, an eddy current type, an optical type, or a strain gauge type. Alternatively, the type of the sensor element 30 is not limited to a vibrating type, but may be, for example, an optical type, a rotating type, or a fluid type. In addition, the physical quantity detected by the sensor element 30 is not limited to an angular velocity, but may be an angular acceleration, an acceleration, a velocity, a force or the like.

In addition, although the physical quantity detection device that detects an angular velocity as a physical quantity is shown in the above-mentioned embodiment, the invention is not limited to the angular velocity, but can also be applied to a physical quantity detection device that detects a physical quantity such as an acceleration, a velocity, an angular acceleration, or a force.

Each of the above-mentioned embodiments is an example, and is not limited thereto. For example, each of the embodiments can also be appropriately combined.

The invention includes configurations (for example, configurations having the same functions, methods and results, or configurations having the same objects and effects) which are substantially the same as the configurations described in the above embodiments. In addition, the invention includes configurations in which non-essential elements of the configurations described in the embodiments are replaced. In addition, the invention includes configurations exhibiting the same operations and effects as, or configurations capable of achieving the same objects as, the configurations described in the embodiments. In addition, the invention includes configurations in which known techniques are added to the configurations described in the embodiments.

The entire disclosure of Japanese Patent Application No. 2013-090862, filed Apr. 24, 2013 is expressly incorporated by reference herein.

What is claimed is:

1. A physical quantity detection circuit coupled to a sensor element, the detection circuit comprising:
    a charge amplifier that outputs a differential voltage based on detection signals from the sensor element, wherein the detection signals include a physical quantity component;
    an A/D converter that converts the differential voltage from the charge amplifier to physical quantity data, wherein the physical quantity data is indicative of a magnitude of the physical quantity component provided in the detection signals; and
    a digital arithmetic operation circuit that performs an arithmetic operation process to generate an arithmetic operation signal based on the physical quantity data of the sensor element,
    wherein the arithmetic operation process includes a power supply voltage fluctuation correction process of correcting at least one of the physical quantity data and a signal which is obtained by a portion of the arithmetic operation process with respect to the detection signal, based on a correction expression using a power supply voltage data detected by a voltage sensor.

2. The physical quantity detection circuit according to claim 1, wherein the power supply voltage fluctuation correction process includes a process of correcting an offset of at least one of the detection signal and the signal which is obtained by a portion of the arithmetic operation process with respect to the detection signal.

3. A physical quantity detection device comprising:
    the physical quantity detection circuit according to claim 2; and
    a power supply that outputs a power supply voltage to the physical quantity detection circuit,
    wherein the physical quantity detection circuit includes a power supply voltage sensor that outputs power supply voltage data by A/D-converting the power supply voltage.

4. An electronic apparatus comprising:
    the physical quantity detection circuit according to claim 2; and
    a power supply that outputs a power supply voltage to the physical quantity detection circuit,
    wherein the physical quantity detection circuit includes a power supply voltage sensor that outputs power supply voltage data by A/D-converting the power supply voltage.

5. A moving object comprising:
    the physical quantity detection circuit according to claim 2; and
    a power supply that outputs a power supply voltage to the physical quantity detection circuit,
    wherein the physical quantity detection circuit includes a power supply voltage sensor that outputs power supply voltage data by A/D-converting the power supply voltage.

6. The physical quantity detection circuit according to claim 1, wherein the correction expression is an expression of a quadratic function of the power supply voltage.

7. A physical quantity detection device comprising:
the physical quantity detection circuit according to claim 6; and
a power supply that outputs a power supply voltage to the physical quantity detection circuit,
wherein the physical quantity detection circuit includes a power supply voltage sensor that outputs power supply voltage data by A/D-converting the power supply voltage.

8. An electronic apparatus comprising:
the physical quantity detection circuit according to claim 3; and
a power supply that outputs a power supply voltage to the physical quantity detection circuit,
wherein the physical quantity detection circuit includes a power supply voltage sensor that outputs power supply voltage data by A/D-converting the power supply voltage.

9. A moving object comprising:
the physical quantity detection circuit according to claim 6; and
a power supply that outputs a power supply voltage to the physical quantity detection circuit,
wherein the physical quantity detection circuit includes a power supply voltage sensor that outputs power supply voltage data by A/D-converting the power supply voltage.

10. The physical quantity detection circuit according to claim 1, wherein the arithmetic operation process includes a power supply voltage fluctuation correction amount calculation process of calculating a correction amount of the power supply voltage using the correction expression, and
the power supply voltage fluctuation correction process includes a process of adding the correction amount to at least one of the detection signal and the signal which is obtained by a portion of the arithmetic operation process with respect to the detection signal.

11. The physical quantity detection circuit according to claim 10, wherein the arithmetic operation processing portion performs the power supply voltage fluctuation correction process and the power supply voltage fluctuation correction amount calculation process by digital processing, using detection data obtained by digitizing the detection signal and power supply voltage data obtained by digitizing the power supply voltage.

12. The physical quantity detection circuit according to claim 10, wherein in the arithmetic operation process, a period for which the power supply voltage fluctuation correction amount calculation process is performed is longer than a period for which the power supply voltage fluctuation correction process is performed.

13. A physical quantity detection device comprising:
the physical quantity detection circuit according to claim 10; and
a power supply that outputs a power supply voltage to the physical quantity detection circuit,
wherein the physical quantity detection circuit includes a power supply voltage sensor that outputs power supply voltage data by A/D-converting the power supply voltage.

14. An electronic apparatus comprising:
the physical quantity detection circuit according to claim 10; and
a power supply that outputs a power supply voltage to the physical quantity detection circuit,
wherein the physical quantity detection circuit includes a power supply voltage sensor that outputs power supply voltage data by A/D-converting the power supply voltage.

15. A moving object comprising:
the physical quantity detection circuit according to claim 10; and
a power supply that outputs a power supply voltage to the physical quantity detection circuit,
wherein the physical quantity detection circuit includes a power supply voltage sensor that outputs power supply voltage data by A/D-converting the power supply voltage.

16. A physical quantity detection device comprising:
the physical quantity detection circuit according to claim 1; and
a power supply that outputs a power supply voltage to the physical quantity detection circuit,
wherein the physical quantity detection circuit includes a power supply voltage sensor that outputs power supply voltage data by A/D-converting the power supply voltage.

17. An electronic apparatus comprising:
the physical quantity detection circuit according to claim 1; and
a power supply that outputs a power supply voltage to the physical quantity detection circuit,
wherein the physical quantity detection circuit includes a power supply voltage sensor that outputs power supply voltage data by A/D-converting the power supply voltage.

18. A moving object comprising;
the physical quantity detection circuit according to claim 1; and
a power supply that outputs a power supply voltage to the physical quantity detection circuit,
wherein the physical quantity detection circuit includes a power supply voltage sensor that outputs power supply voltage data by A/D-converting the power supply voltage.

* * * * *